United States Patent [19]
Loechel et al.

[11] Patent Number: 5,895,485
[45] Date of Patent: Apr. 20, 1999

[54] METHOD AND DEVICE USING A REDUNDANT CACHE FOR PREVENTING THE LOSS OF DIRTY DATA

[75] Inventors: Barbara Loechel, Toms River; Federico Giovannetti, Ocean, both of N.J.

[73] Assignee: ECCS, Inc., Tinton Falls, N.J.

[21] Appl. No.: 08/805,146

[22] Filed: Feb. 24, 1997

[51] Int. Cl.[6] .................................................. G06F 13/00
[52] U.S. Cl. ..................... 711/119; 711/144; 711/143; 711/133; 711/113
[58] Field of Search ........................ 395/873; 711/136, 711/140, 143, 119

[56] References Cited

U.S. PATENT DOCUMENTS

| | | |
|---|---|---|
| 4,490,782 | 12/1984 | Dixon et al. . |
| 4,920,478 | 4/1990 | Furuya et al. . |
| 5,195,101 | 3/1993 | Guenthner et al. . |
| 5,297,148 | 3/1994 | Harari et al. . |
| 5,325,488 | 6/1994 | Carteau et al. . |
| 5,359,569 | 10/1994 | Fujita et al. . |
| 5,408,651 | 4/1995 | Flocken et al. . |
| 5,511,224 | 4/1996 | Tran et al. . |
| 5,548,711 | 8/1996 | Brant et al. . |
| 5,623,700 | 4/1997 | Parks et al. . |
| 5,642,494 | 6/1997 | Wang et al. . |
| 5,664,150 | 9/1997 | Isaac et al. . |

*Primary Examiner*—Tod R. Swann
*Assistant Examiner*—David Laugjahr
*Attorney, Agent, or Firm*—Michaelson & Wallace; Peter L. Michaelson; John C. Pokotylo

[57] ABSTRACT

A method and device for writing blocks from a client to a storage device. First and second caches are provided between the client and the storage device. An I/O management process accepts a write request from the client. If the write request is a write-back request, the I/O management process stores the blocks in the first cache, and transferring the blocks from the first cache to the second cache. If, on the other hand, the write request is not a write-back request, a write-through request is performed in which blocks are stored in the first cache, stored in the storage device, but not stored in the second cache. When the blocks are flushed from the first cache to store the blocks on the storage device, the dirty map of the cache header corresponding to the blocks is cleared from the second cache.

18 Claims, 16 Drawing Sheets

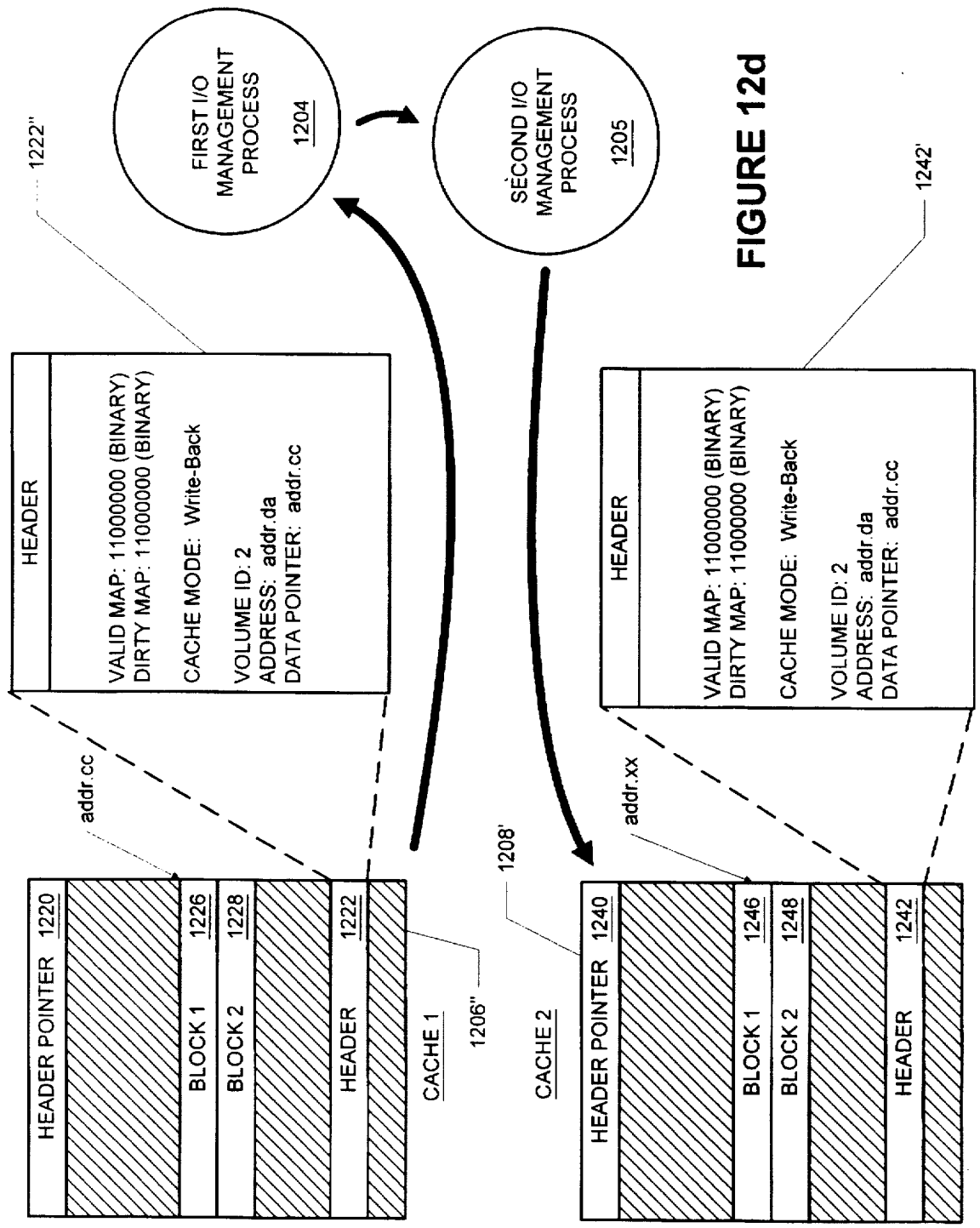

METHOD AND DEVICE USING A REDUNDANT CACHE FOR PREVENTING THE LOSS OF DIRTY DATA

BACKGROUND OF THE INVENTION

1. Field of the Invention

The present invention concerns computer memory systems, and in particular, a system with redundant data caches for preventing data loss should one cache fail.

2. Related Art

Disk drive based memory affords large amounts of storage capacity at a relatively low cost. Unfortunately, access to disk drive memory is slow relative to the processing speed of modern microprocessors. A cost effective, prior art solution to this problem provides a cache memory between the processor and the disk memory system. The storage capacity of the cache memory is relatively small, but can be used to provide high speed access to the data.

The operating principle of the disk cache memory is the same as that of a central processing unit (or CPU) cache. More specifically, the first time an instruction or data location is addressed, it must be accessed from the lower speed disk memory. Subsequent accesses to the same instruction or data are done via the faster cache memory, thereby minimizing access time and enhancing overall system performance. However, since the storage capacity of the cache is limited, and typically is much smaller than the storage capacity of the disk storage, the cache often is filled and some of its contents must be changed as new instructions or data are accessed from the disk storage. The cache is managed, in various ways, such that it stores the instruction or data most likely to be needed at a given time. When the cache is accessed and contains the requested data, a cache "hit" occurs. Otherwise, if the cache does not contain the requested data, a cache "miss" occurs. Thus, the cache contents are typically managed in an attempt to maximize the cache hit-to-miss ratio.

FIG. 1 illustrates a high level block diagram of a conventional disk array controller 104 arranged between a host 102 and a disk storage array 106. The host computer 102 may include a processor 114, a memory 116, and an input/output interface 118 sharing a bus 112. The memory 116 may include a program storage section for storing program instructions for execution by the processor 114. The input/output device 118 may use a standard communications protocol, such as the Small Computer System Interface (or "SCSI") protocol for example, to facilitate communication with peripheral devices. The disk array 106 may include an array of magnetic or optical disks 132 for example.

The disk array controller 104 includes a controller device 124, a cache 126, and input/output interface(s) 128 and 130, which share a bus 122. The controller 124, which may be an application specific integrated circuit (or "ASIC") or a processor executing stored instructions for example, controls reading from and writing to the cache 126 and the disk array 106. The input/output interface 128 may use the SCSI protocol to facilitate communication between it and the host computer 102. Similarly, the input/output interface 130 may use the SCSI protocol to facilitate communication between it and the disk array 106.

The conventional system of FIG. 1 operates as follows. If the host computer 102 issues a read command to the disk array controller 104 and if the information requested is in the cache 126, the controller 124 forwards the requested information to the host computer 102 and a disk access is not necessary. To reiterate, this is known as a cache "hit". If, on the other hand, the information requested is not in the cache 126, the controller 124 retrieves the requested information from the disk array 106 and forwards it to both the cache 126 and the host computer 102. To reiterate, this is known as a cache "miss".

Certain systems include redundant devices to increase reliability. Such systems may include redundant processors and/or redundant data storage. For example, a system discussed in U.S. Pat. No. 5,548,711 (hereinafter referred to as "the Brant et al patent") includes redundant cache controllers. (See e.g., FIG. 4 of the Brant et al patent.) A significant challenge in systems with redundant caches is maintaining "cache coherency" without adversely affecting system performance. Cache coherency permits continued operation without data loss should one of the caches fail.

One prior art solution to the problem of maintaining cache coherency, was to maintain identical caches in each of the subsystems. There are two different ways to maintain identical caches. In the first cache coherency maintenance solution, the entire cache may be periodically transmitted from the main cache to each of the remaining redundant cache(s). In the second cache coherency maintenance solution, each time a cache operation takes place on one cache, the redundant cache(s) is (are) notified of the operation and sent any corresponding data. Then, each of the redundant cache(s) is (are) updated. These two implementations have an obvious problem; the overhead associated with the data transmissions counteracts the benefits of having a cache. The first solution has an additional problem; the cache is not coherent at all times. That is, the data is vulnerable to loss during the period between transmissions.

SUMMARY OF THE INVENTION

In a system having a first cache and a second cache arranged between a client and a persistent memory device, the present invention provides a method for managing input/output requests which prevents data loss. The method of the present invention (a) requests a cache line in the first cache, (b) flags one or more blocks of dirty data in the first cache if the input/output request is a write request, (c) places data in cache, (d) transmits the one or more blocks of dirty data from the first cache to the second cache based on the flagging, if the I/O request is a write request, to a volume with write-back cache enabled, (e) updates the second cache based on the data received, (f) flags the same blocks as valid, and (g) releases the cache line.

The step of flagging one or more blocks of dirty data in the first cache is preferably achieved by updating a dirty map in the first cache to indicate the one or more blocks of dirty data in the first cache.

The method of the present invention may further determine whether the requested cache line results in a cache miss. If the requested cache line results in a cache miss, the method of the present invention (i) finds an empty cache line, and (ii) clears the dirty map and the valid map of the empty cache line.

The method of the present invention may further configure each of the first and second caches to have a cache directory and cache data, the cache directory including a table of headers, each of the headers corresponding to a cache line.

The method of the present invention may further set, in response to an I/O request to a volume with write-back cache enabled, the cache mode of a cache line to write-back.

The present invention provides a system for providing storage for a client, and includes (a) a mass storage device, (b) a first controller, including a cache, for controlling the mass storage device in response to requests from the client, and (c) a second controller, including a cache, for controlling the mass storage device in response to requests from the client, wherein one of the controllers, responding to an I/O request, sends dirty data to the cache of the other controller.

In one embodiment of the system of the present invention, the dirty map of the cache of the other controller is cleared upon a flush of the cache of the one controller responding to the I/O request.

In a preferred embodiment of the system of the present invention, at least one of the first and second controllers includes (i) a client input/output interface unit for facilitating communication with the client, (ii) a target input/output interface unit for facilitating communication with the mass storage device, (iii) a cache, (iv) an I/O management unit for controlling the cache and the I/O request, and (v) a bus system for permitting the communication of data between the client input/output interface unit, the target input/output interface unit, the cache and the I/O management unit.

In a preferred embodiment of the system of the present invention, the client input/output interface unit and/or the target input/output interface unit support the SCSI protocol.

In a preferred embodiment of the system of the present invention, the cache data section includes cache lines, each cache line storing one or more blocks of data. In this embodiment, the cache directory section includes a table of headers, each of the headers corresponding to a cache line. Each of the headers may include a dirty map which identifies blocks of dirty data in the cache line corresponding to the header.

In a preferred embodiment of the system of the present invention, at least one of the first and second controllers includes (i) at least one client input/output interface unit, (ii) at least one target input/output interface unit, (iii) a processor, (iv) a program storage, (v) a local bus shared by the processor and the program storage, the cache, at least one of the client I/O units, and at least one of the target I/O units, (vi) an input/output bus shared by the client input/output interface unit and the target input/output interface unit, and (vii) a SCSI bus shared by the client input/output interface unit, the target input/output interface unit, and the cache. In this embodiment, the cache data section may include cache lines, each cache line storing one or more blocks of data. Further, the cache directory section may include a table of headers, each of the headers corresponding to a cache line. Each of the headers may include a dirty map which identifies block(s) of dirty data in the cache line corresponding to the header.

Finally, the present invention provides a method for writing data from a client to a storage device. The method (a) provides a first cache between the client and the storage device, (b) provides a second cache between the client and the storage device, (c) accepts a write request from the client, (d) stores the data in the first cache, and (e) transfers the blocks from the first cache to the second cache if the write request is to a volume with write-back cache enabled. This method may further (f) flush blocks of the data from the first cache to store the blocks of data on the storage device (this includes clearing the dirty map of the associated cache header) and (g) clear a dirty map of a cache header corresponding to the blocks of data from the second cache. If the write request is not a write-back request, a write-through request may be performed in which blocks are stored in the first cache, stored in the storage device, but not stored in the second cache.

BRIEF DESCRIPTION OF THE DRAWINGS

FIGS. 12a through 12e illustrate the state of various components of a system using an input/output management process of the present invention.

DETAILED DESCRIPTION

The inventors of the present invention have recognized that the most important function of cache coherency in a redundant system is to preserve data already in the cache that has not yet been committed to persistent memory. Such data may be referred to as "dirty data". As far as an external source (e.g., a host processor or client) is concerned, the "dirty data" has already been committed to persistent memory. If one cache fails and another takes over, any non-dirty data can be read from persistent memory. Therefore, it is not paramount that such non-dirty data be consistent between the subsystems; only dirty data must be consistent.

The inventors of the present invention have further recognized that dirty data only exists when the cache is running in write-back mode. Write-back cache does not immediately commit the data to persistent storage. Rather, it does so at a later time, typically, when the cache line is needed for a new location. An advantage of write-back cache is that a number of disk writes can be done during one physical disk access. However, data stored in write-back cache is exposed to loss should one of the subsystems (e.g., cache) fail. To the contrary, when the cache is running in a write-through mode, the data is both stored in the cache and committed to persistent memory. Thus, in the present invention, data is transmitted to a redundant cache only when the cache is operating in the write-back mode. To further reduce overhead, only write operations and flush operations are transmitted to the redundant subsystem.

The redundant subsystem (e.g., cache) should know which data has been flushed from the primary subsystem so that it does not, during a flush of its own, overwrite more recent data that has been committed to persistent memory.

With the above in mind, the system of the present invention will first be described referring to FIGS. 2 through 4 and 11. Next, the operation of the this system will be described referring to FIGS. 6 through 10 and 12a through 12e.

Figure 2:
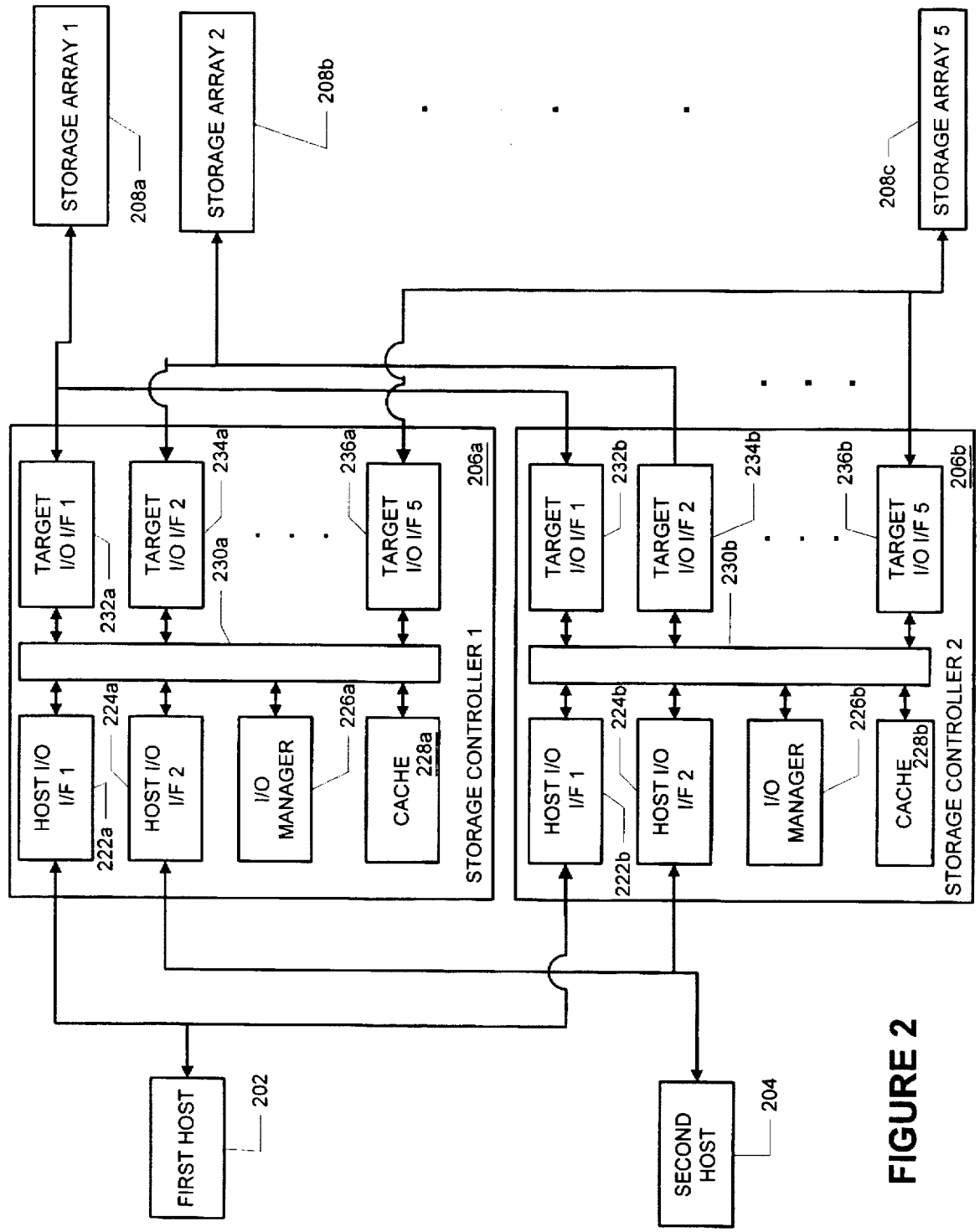
FIG. 2 is a block diagram illustrating a system, having redundant hosts and redundant storage controllers, which operates in accordance with the present invention.

FIG. 2 is a block diagram of the system 200 of the present invention. This fault tolerant system offers high reliability by virtue of its redundant host processors (or clients) 202 and 204, its redundant storage controllers 206, and its redundant storage arrays 208. The host processors 202 or 204 may be clients of a shared storage resource. Finally, as shown in FIG. 2, either of the host processors 202 and 204 may access any of the storage arrays 208 via either of the storage controllers 206.

Figure 1:
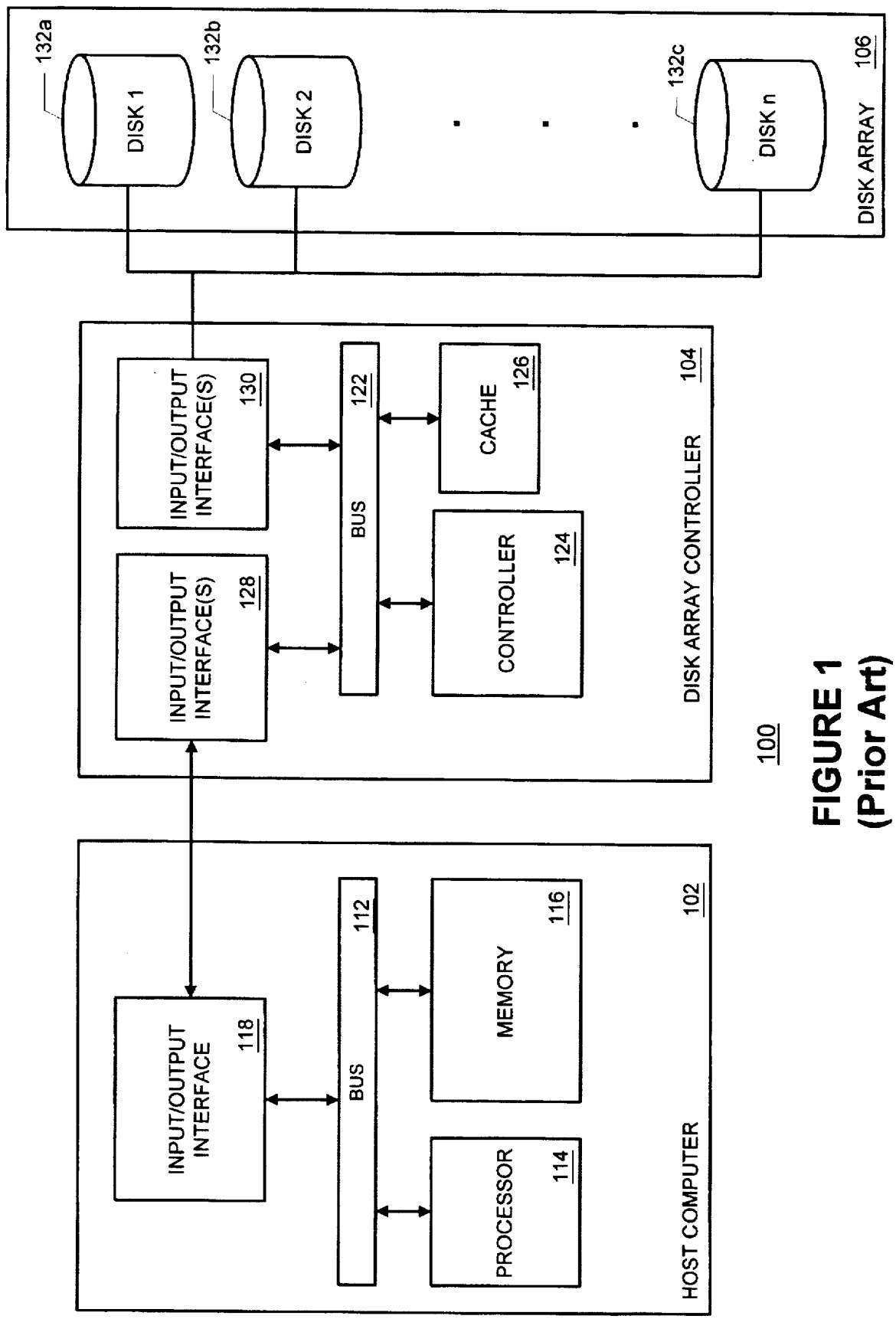
FIG. 1 is a block diagram illustrating a conventional system employing a disk array controller.

Each of the host processors 202 and 204 may include a processor, memory, and input/output interface(s) sharing a bus, as was the case in the conventional host computer 102 described above with reference to FIG. 1. Further, each of the storage arrays 208 may be disk arrays 106 as described above with reference to FIG. 1.

As is further shown in FIG. 2, each of the storage controllers 206 includes a first host input/output interface unit 222, a second host input/output interface unit 224, an I/O manager 226, a cache 228, and a number (e.g., five) of target input/output interface units 232, 234, 236, etc. Each of these components share a bus system 230.

Figure 11:
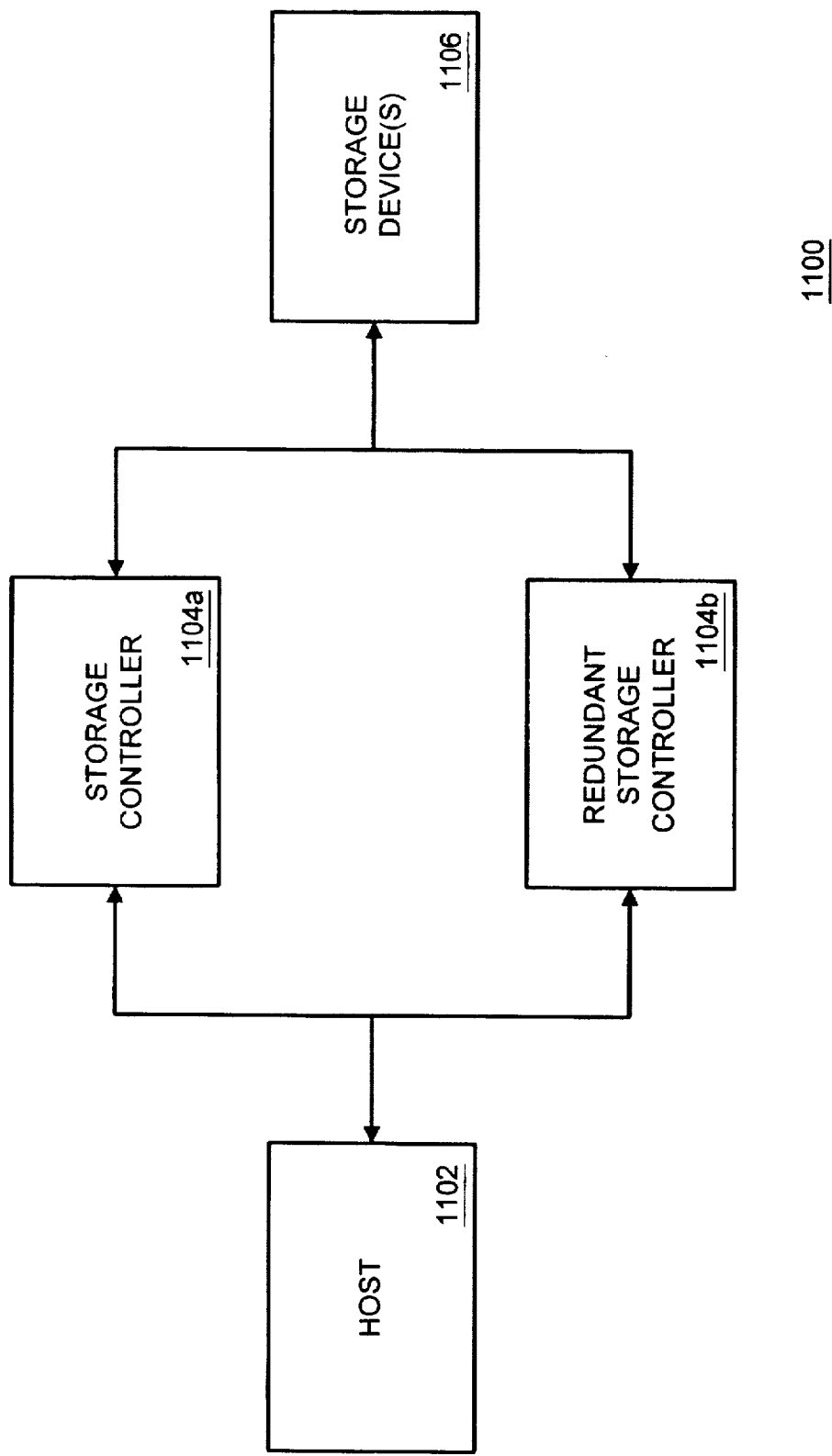
FIG. 11 is a high level block diagram of a system which may use the method of the present invention.

In each of the storage controllers 206, the first host input/output interface unit 222 is coupled with a corresponding input/output interface unit (not shown) of the first host 202. Similarly, in each of the storage controllers 206, the second host input/output interface unit 224 is coupled with a corresponding input/output interface unit (not shown) of the second host 204. Although not explicitly shown in FIG. 2, further host processors may be coupled with each the storage controllers 206, and perhaps additional storage controllers, via additional input/output interface units. The input/output interface units may support the SCSI protocol for example. Apart from the system 200 shown in FIG. 2, as shown in FIG. 11, the method of the present invention may even be used in a system 1100 in which a single host (or client) 1102 accesses a storage device(s) 1106 via either of the storage controllers 1104.

Further, in each of the storage controllers 206, the first target input/output interface unit 232 is coupled with a corresponding input/output interface unit (not shown) of the first storage array 208a (e.g., disk array). In each of the storage controllers 206, further target input/output interface units (e.g., 234, 236, etc.) are coupled with a corresponding input/output interface unit(s) (not shown) of further storage arrays (e.g., 208b, 208c, etc.).

Read and write-through operations in the system 200 will now be described referring to FIGS. 2, 6, and 7. In the following examples, it will be assumed that the first host 202 issues an I/O request, that the second storage controller 206b services the I/O request, and that the first storage controller 206a is a redundant storage controller.

In the following, the term "volume" defines a logical drive. A single disk drive may be configured to define one or more volumes. Alternatively, a single volume may span multiple disk drives and storage arrays (208) as is common with RAID (Redundant Arrays of Independent Disks) systems. The SCSI-2 protocol permits the definition of 16 volumes.

An "I/O REQUEST" is a request to read or write a number of "blocks" from or to, respectively, a logical volume. A block may be, but is not limited to, 512 bytes of adjacent data. An I/O REQUEST may also include a start address, including a volume and an address within that volume for example, at which the read or write is to start.

When a volume is initially defined, it may include a "RAID level" definition. A cache type or cache mode may be assigned to the volume and may be changed by an authorized user.

A RAID level describes a type of RAID system used. For example: RAID level 0 (commonly referred to as "data striping") distributes data across disks of an array; RAID level 1 (commonly referred to as "mirroring") replicates all data on two separate disks; RAID level 2 protects data using a Hamming code and distributes data across a number of disks; RAID level 3 (commonly referred to as "parallel transfer disks with parity") subdivides each data sector, distributes the data across multiple disks, and stores redundant information on a dedicated parity disk; RAID level 4 stripes data and stores redundant information on a dedicated parity disk; RAID level 5 stripes data sectors and intersperses redundant information with the user data; and RAID level 6 is the same as RAID level 5 but includes additional, independently computed, redundant information. RAID level 10 stripes data across a set of paired mirrored disks.

In the system of the present invention, cache type is preferably defined on a per-volume basis and may be: (a) "none"—in which the cache is not used; (b) "write-back"—in which the cache stores data to be written to persistent memory later; or (c) "write-through"—in which the cache stores data which is written to persistent memory before the host is notified that the I/O request has completed.

Figure 6:
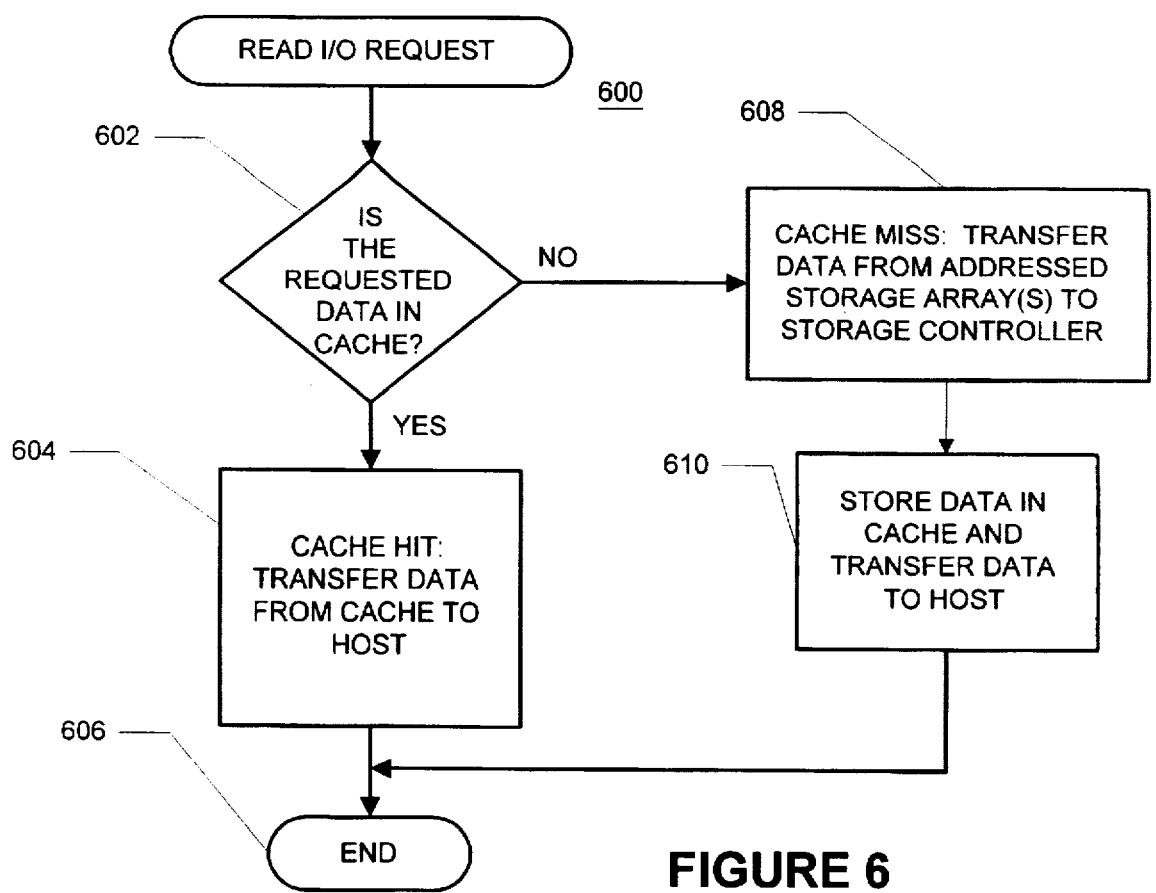
FIG. 6 is a flow diagram of a I/O request operation.

FIG. 6 is a flow diagram which illustrates steps performed when the host 202 issues a READ I/O request 600. The READ I/O request is forwarded from the host 202 to the I/O manager 226b of the second storage controller 206b via link, first host input/output interface 222b, and bus system 230b. As shown in step 602, the I/O manager 226b determines whether or not the requested data is stored in the cache 228b. As shown in steps 602 and 604, if the requested data is stored in the cache 228b, a cache hit occurs and the requested data is transferred from the cache 228b to the host 202 via the I/O manager 226b, the bus system 230b, the first host input/output interface unit 222b, and the link. If, on the other hand, the controller 226b determines the that requested data is not stored in the cache 228b, a cache miss occurs and the requested data is obtained from the addressed storage array(s) 208 and transferred to the I/O manager 206b via the appropriate target input/output interface unit 232b, 234b, 236b, etc. (See e.g., steps 602 and 608.) As shown in step 610, the I/O manager 226b then stores the data in the cache 228 and transfers the data to the host 202. Apart from the above example, recall that either of the storage controllers 206 can process I/O requests from either of the hosts 202 and 204.

Figure 7:
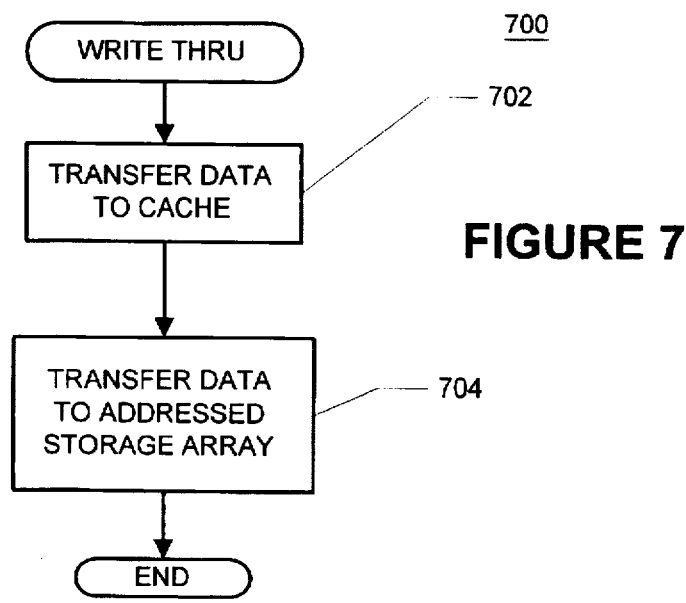
FIG. 7 is a flow diagram of a write I/O request to a volume with write-through enabled.

FIG. 7 is a simplified flow diagram which illustrates steps performed when the host 202 issues a WRITE I/O request 700 to a volume with write-through cache enabled. First, as shown in step 702, the I/O request is forwarded from the host 202 to the I/O manager 226b and cache 228b of the second storage controller 206b via link, first host input/output interface 222b, and bus system 230b and stored in cache 228b. Next, as shown in step 704, the I/O manager 226b transfers the data to the appropriate storage array(s) 208, via the bus system 230b and an appropriate one of the target input/output interface units 232b, 234b, 236b, etc.

Figure 3:
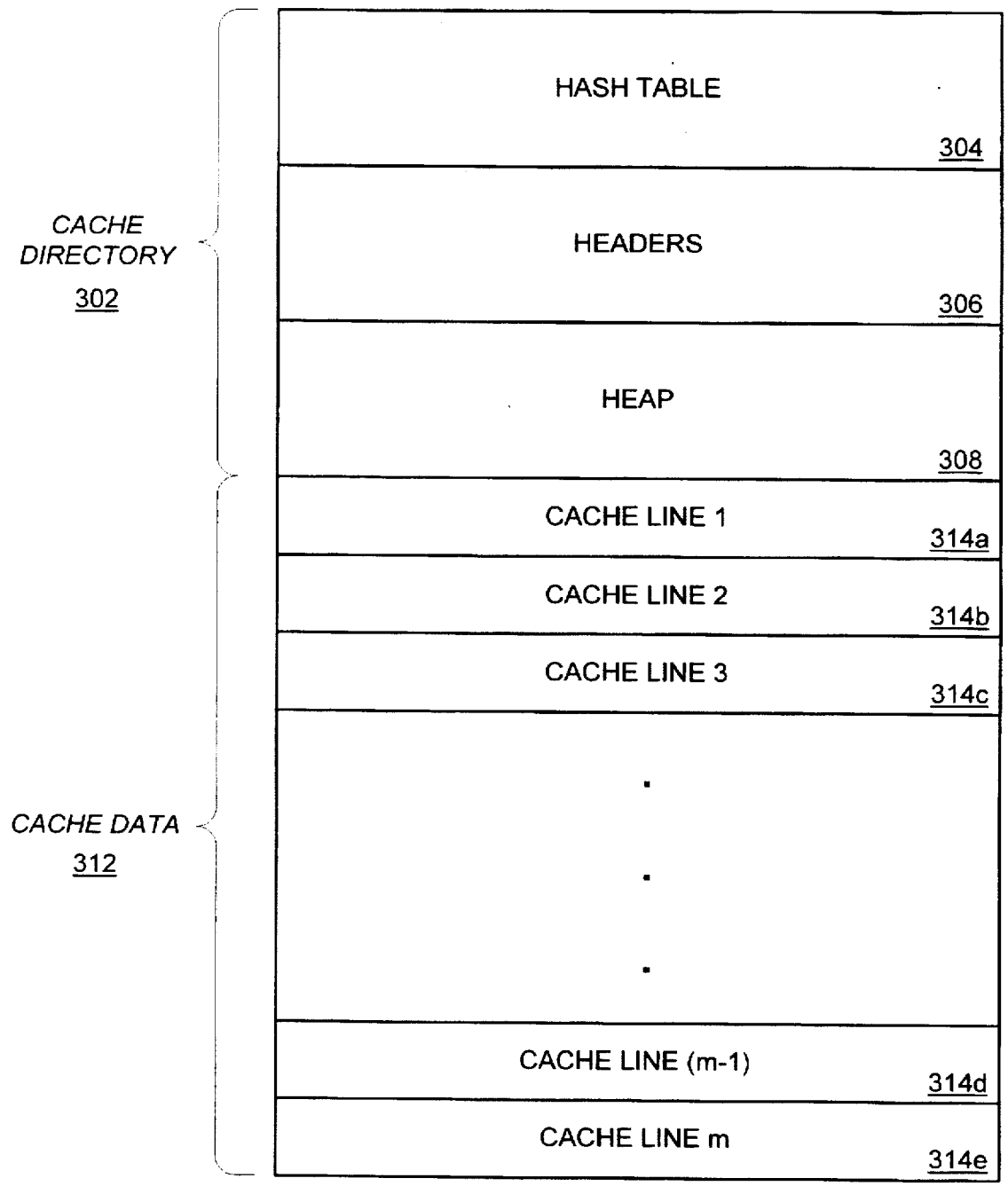
FIG. 3 illustrates a logical configuration of the cache memory which may be used in the system of the present invention.

The write-back operation in the system 200 is more involved and will now described, referring to FIGS. 2, 8a, 8b, and 9 after a more detailed description of the cache 228. FIG. 3 illustrates the logical (i.e., not necessarily physical) structure of a cache 228. Basically, the cache 228 includes a cache directory 302 and cache data 312. The cache data 312 section includes cache lines 314 of equal length each of which stores one or more blocks of data.

The cache directory section 302 includes information used to manage the cache 228 and may include, for example, a hash table 304, headers 306, and a heap 308. As will be discussed below with reference to FIG. 4, the hash table 304, in conjunction with the headers 306, is used to determine whether a particular block is contained within the cache 228 at a given time. The heap 308, in conjunction with the headers 306, is used to identify a cache line 314 that is a best candidate for replacement when a cache miss occurs. Since the details of the heap 308 are not particularly relevant of this application, the heap 308 is not described in detail here. However, an example of a heap 308 may be found in U.S. patent application Ser. No. 08/634,886, filed on Apr. 19, 1996, entitled "Method and Apparatus for Computer Disk Management", and assigned to the same assignee as the present application (incorporated herein by reference).

Figure 4:
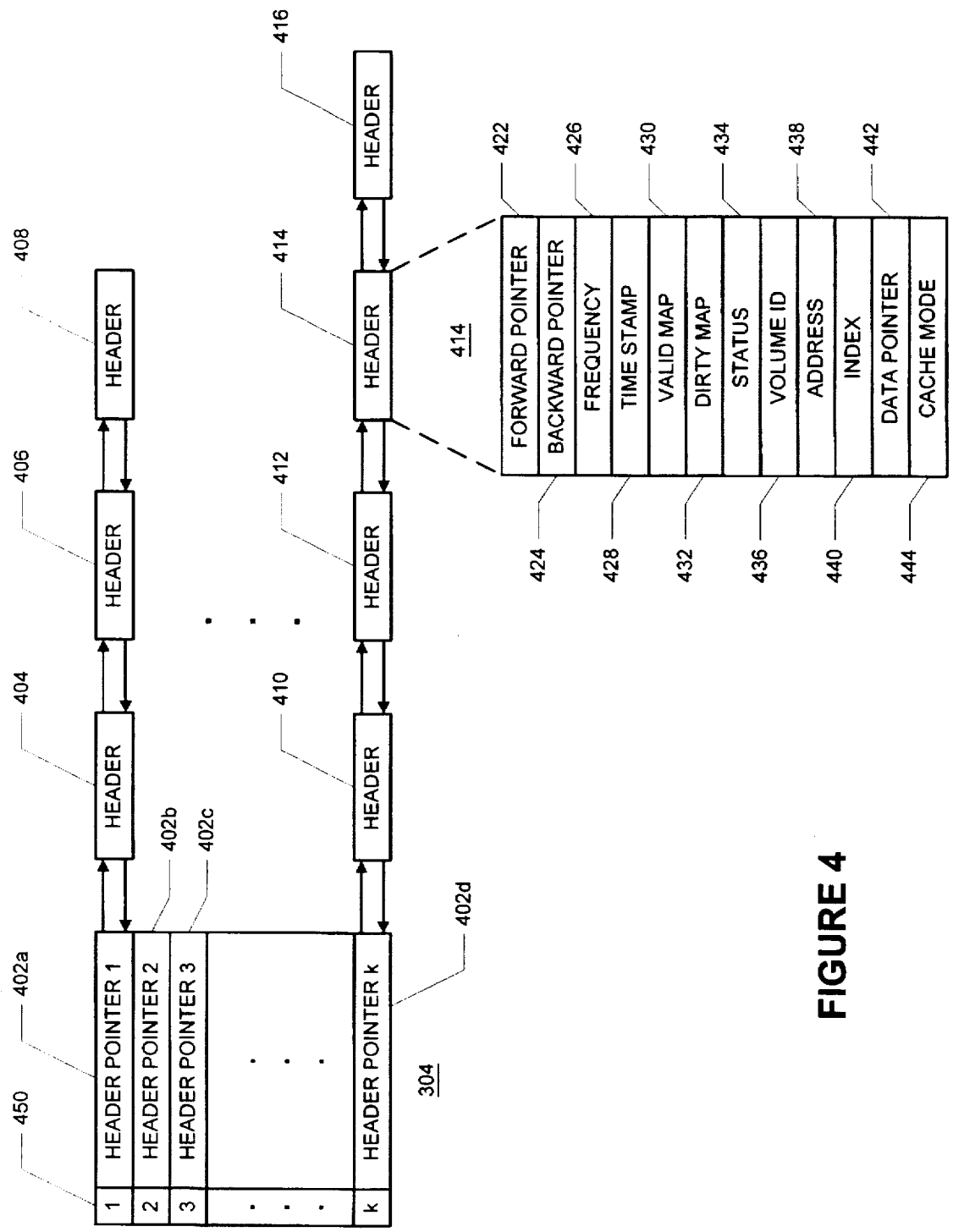
FIG. 4 illustrates information stored in the hash table of the cache memory which may be used in the system of the present invention.

FIG. 4 is a diagram of a hash table 304 and associated chains of linked headers. Basically, the hash table 304 is an array of pointers 402. An index 450 identifies the position of the pointers 402 in the hash table 304. Each pointer 402 points to a corresponding first header in a doubly-linked chain of headers. For example, header pointer 402a points to a first header 404 of a doubly-linked chain of headers including headers 404, 406 and 408. Similarly, header pointer 402d points to a first header 410 of a doubly-linked chain of headers including headers 410, 412, 414, and 416. (Other header chains are not shown for clarity.) The linking of the headers may be used to facilitate the lookup of a cache line to determine whether a "hit" or a "miss" occurs.

Each cache line 314 has an associated header. Each header, as shown by header 414 for example, includes (i) a forward pointer field 422, (ii) a backward pointer field 424, (iii) a frequency field 426, (iv) a time stamp field 428, (v) a valid map field 430, (vi) a dirty map field 432, (vii) a status field 434, (viii) a volume identifier field 436, (ix) address field 438, (x) an index field 440, (xi) a data pointer field 442, and (xii) a cache mode field 444.

The forward pointer field 422 may include information which provides an address which points to a next header (e.g., header 416) in the chain, while the backward pointer field 424 may include information which provides an address which points to a previous header (e.g., header 412) in the chain. If the header is the first in the chain (e.g., header 410), the information in the backward pointer field 424 will point to a header pointer 402 in the hash table 304. The frequency field 426 may include information which identifies the number of times the particular cache line 314 associated with the header (e.g., via the address, index, and data pointer fields) has been accessed. The time stamp field 428 may include information which identifies a time at which the particular cache line 314 associated with the header was last accessed. The status field 434 may include information which indicates whether a cache line is free. The index field 440 may include information which provides an index into the heap 308 for the cache line. These fields are not particularly relevant to the present invention since they are used, primarily, to determine a cache line that is a best candidate for replacement when a cache miss occurs.

The valid map field 430 may include a bit map, in which each bit corresponds to a particular block in the cache line 314 and identifies whether the block contains valid data. More specifically, a cache line has a predefined (e.g., at system initialization) number (e.g., 32, 64, 128, etc.) of fixed length blocks. In some instances, not all of the blocks of a cache line will be filled with valid data. The dirty map field 432 may include a bit map, in which each bit corresponds to a block of data in the cache line 314 and identifies if data has been written to the cache line but not to the storage array. The dirty map may be used by a flushing device which periodically (or when certain predefined conditions are met) checks for dirty blocks, and if any are found, writes them to an appropriate storage array.

The volume identifier field 436 may include information which identifies the volume to which the cache line belongs. The address field 438 may include information which provides the volume address of the first block of the cache line. The data pointer field 442 may include information which identifies the address of the cache line within the cache. Lastly, the cache mode field 444 may include information which identifies a mode (e.g., none, write-through, or write-back) of the cache line 228. As discussed above, the cache mode is defined on a per volume basis and may be changed at any time by an authorized user.

Figure 8A:
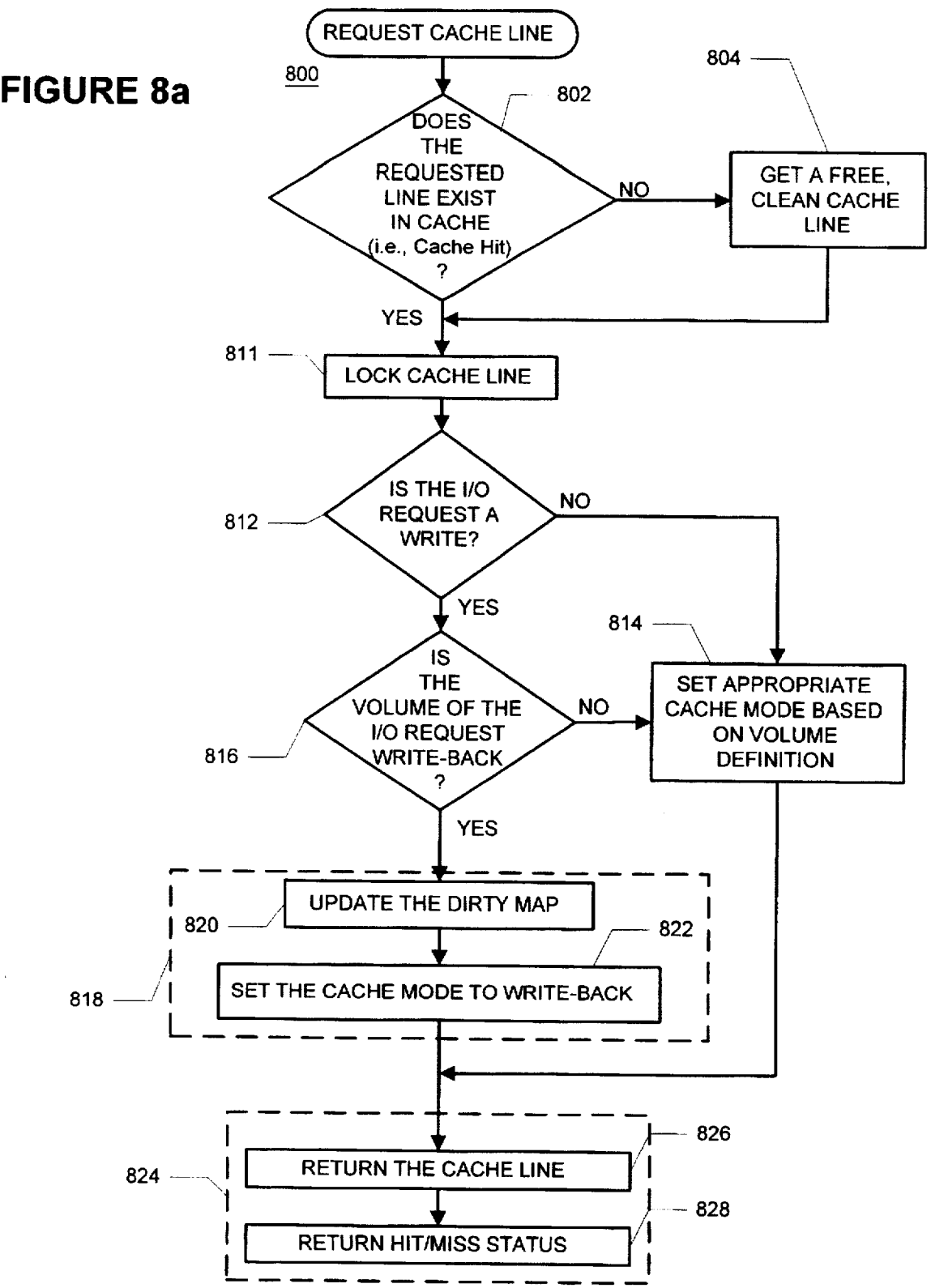
FIG. 8a is a flow diagram of a request cache line operation.
Figure 8B:
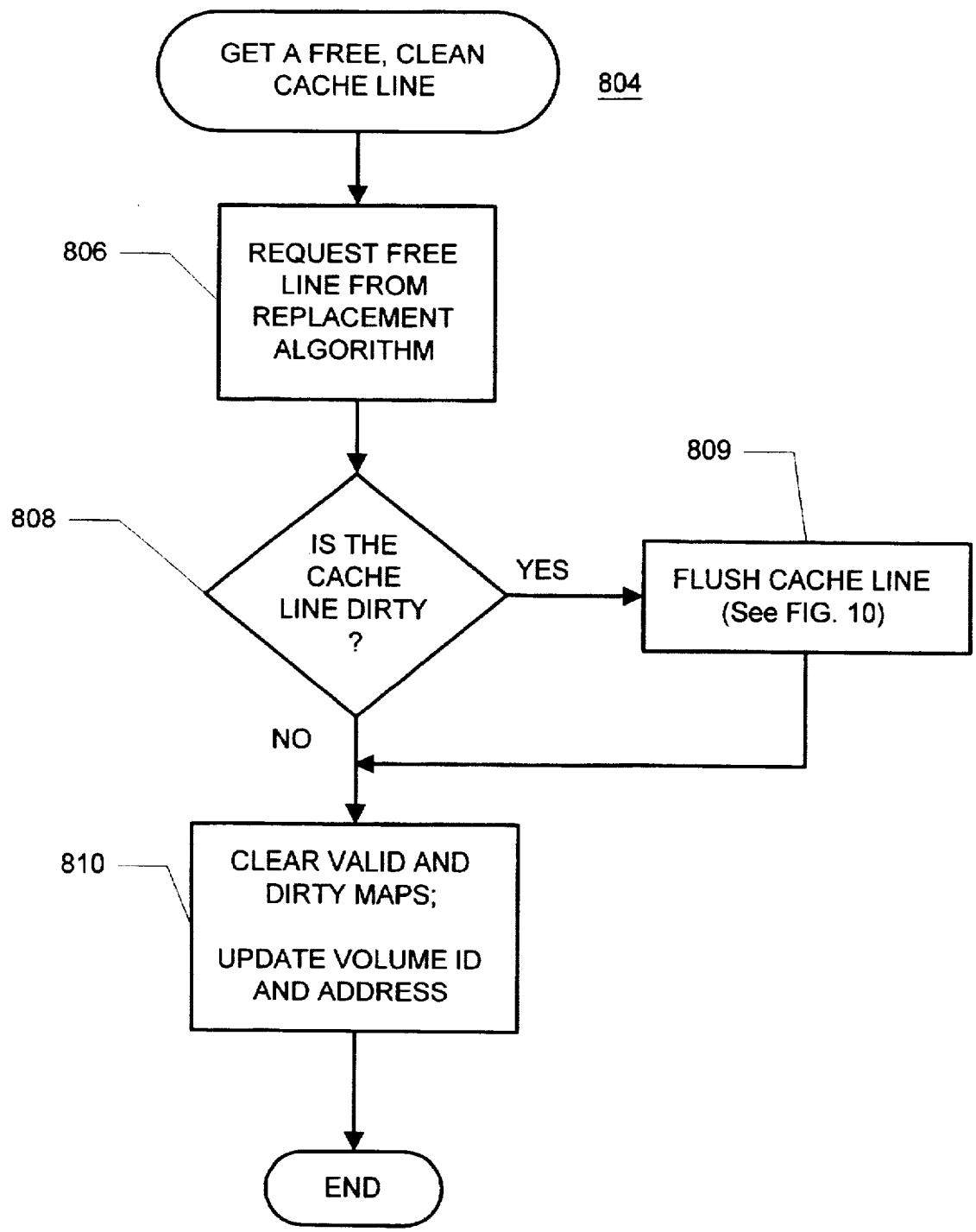
FIG. 8b is a flow diagram of a routine for getting an empty cache line.
Figure 9:
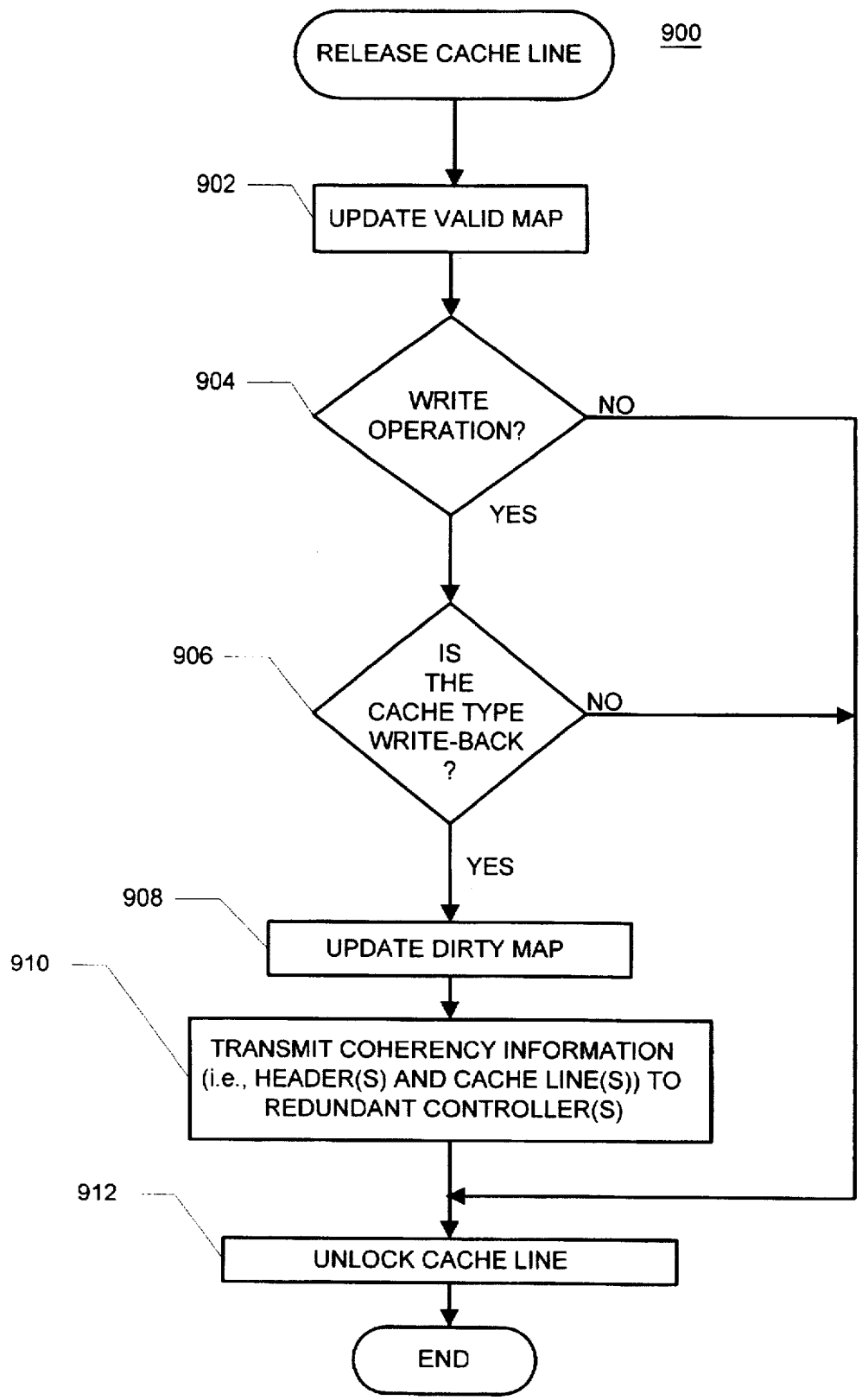
FIG. 9 is a flow diagram of a release cache line operation.

Having described the logical structure of a cache 228, the operation of the system 200 of the present invention is now described referring to FIGS. 8a, 8b and 9. Basically, in response to an I/O request from the host, an "I/O manager" requests cache line(s) to fulfill the host's I/O request, performs the requested operation, and subsequently releases the cache line(s).

FIG. 8a is a flow diagram which illustrates the request of a cache line 800 (performed by the I/O manager), for example, in response to a host I/O request. First, as shown in step 802, it is determined whether the requested line exists in cache. That is, the I/O Manager 226 checks its cache 228 for the requested line.

If the line is a miss, a free clean line is obtained as shown in FIG. 8b. A free line is requested from the replacement algorithm (step 806). If the line is dirty (decision step 808), the line is flushed by the flushing algorithm (step 809). Details of this algorithm can be found in FIG. 10. In both cases, the valid and dirty maps are cleared and the volume ID and address are appropriately updated (step 810).

Processing continues, as it would if the requested line did exist in the cache 228b (i.e., under the condition of a "cache hit"), with step 811 which locks the cache line. As shown in steps 812 and 816, if the I/O request is not a write, or if the volume of the I/O request is not write-back, the cache mode field 444 of the header of the cache line 314 is set, based on volume identification, to the appropriate cache mode as shown in step 814. That is, the cache mode is set to either write-through or write-back based on the then existing cache mode of the addressed volume. On the other hand, if the I/O request is a write and if the volume cache type is write-back, step 818 is performed. That is, as shown in step 820, the dirty map 432 of the cache line header is updated to indicate that data is stored in the cache but not in persistent storage. In addition, as shown in step 822, the cache mode field 444 of the header of the cache line 314 is set to write-back.

Finally, step 824 is carried out. That is, as shown in steps 826 and 828, the requested cache line 314 and the hit/miss status are returned to the I/O manager 226b.

FIG. 9 is a flow diagram which illustrates the release of a cache line 314 by the I/O manager 226. First, as shown in step 902, the valid map 430 of the cache line header is updated. Next, as shown in steps 904, 906, and 912 if the I/O request is not a write operation or if the cache type in the cache header is not write-back, the cache line is unlocked and then the processing ends. If, on the other hand, the I/O request is a write operation and the cache type in the cache header is write-back, the dirty map 432 of the cache line header is updated as shown in step 908. Next, as shown in step 910, coherency information (e.g., the cache line 314 and header) is sent to the redundant cache(s). For example, referring to FIG. 2, the I/O manager 226b of the storage controller 206b processing the request may transfer coherency information from itself and the cache 228b, via bus system 230b, a target input/output interface 232b, 234b, or 236b, etc., a corresponding link, a corresponding target input/output interface 232a, 234a, or 236a, etc. of the redundant storage controller 206a, bus system 230a, I/O manager 226a, and the cache 228a. Finally, as shown in step 912, the cache line is unlocked.

Figure 10:
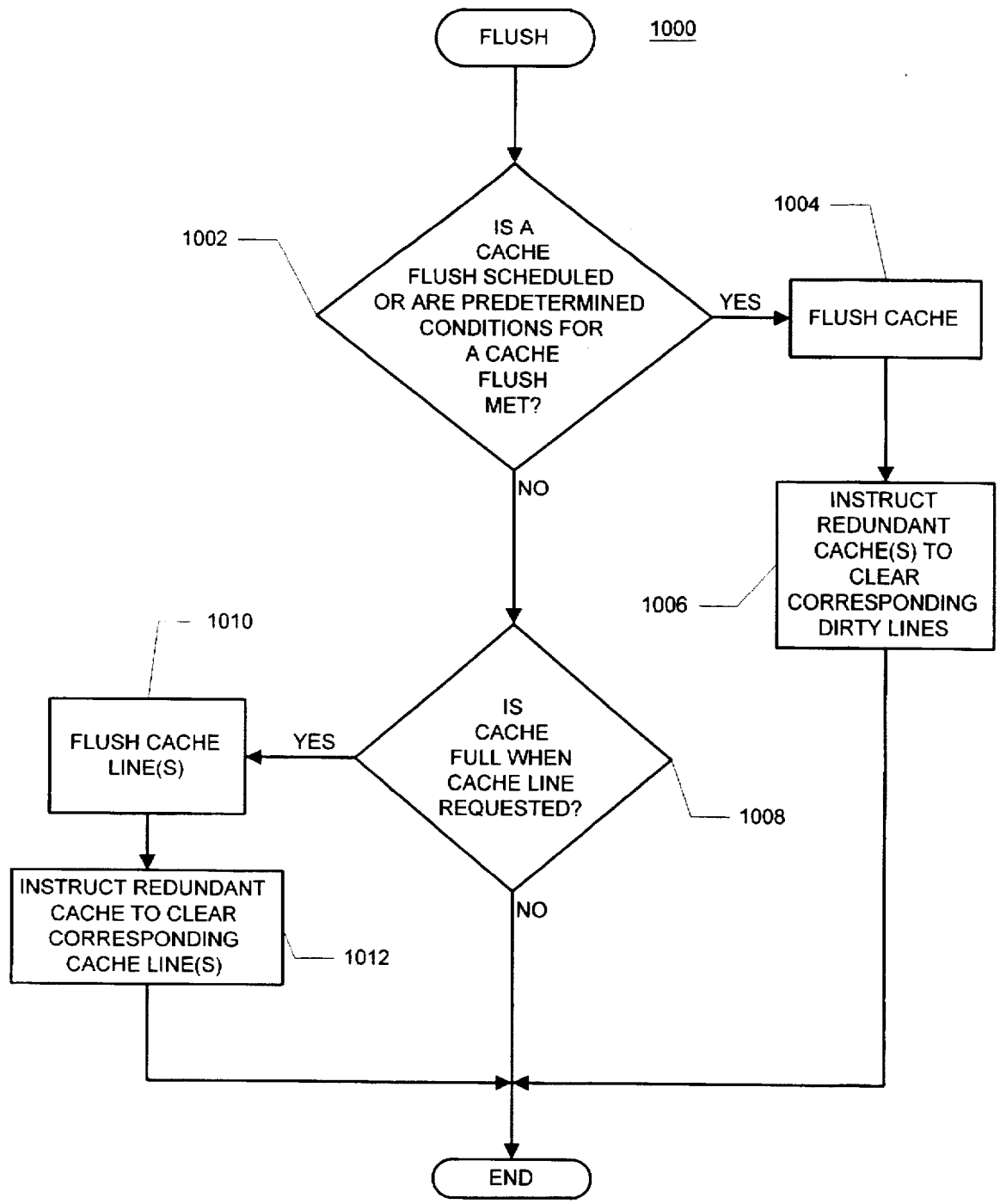
FIG. 10 is a flow diagram of a cache flush operation and a cache line flush operation.

As mentioned above, in the system of the present invention, the redundant cache line(s) are cleared when the cache line(s) of the storage controller processing the request are flushed. FIG. 10 is a flow diagram of a cache flush process 1000. Recall that a cache may be flushed periodically or when certain predefined conditions are met. Further, recall from step 808 of FIG. 8b above, a cache line may be flushed as part of the replacement algorithm. Accordingly, as shown in steps 1002, 1004, and 1006, if a cache flush is scheduled or if predetermined conditions for a cache flush are met (step 1002), the cache is flushed as shown in step 1004. That is, data in the cache is written to the persistent memory. As the lines of data are flushed from the cache of the flushing I/O manager, the redundant I/O manager is instructed to clear the corresponding cache line(s) of its own cache (e.g., to reset the dirty map of the cache line header(s) of those cache line(s) from its own cache). This instruction may be communicated to the redundant cache 228a via I/O manager 226b, bus system 230b, one of the target input/output interface units 232b, 234b, or 236b, etc., a corresponding link, a corresponding target input/output interface unit 232a, 234a, or 236a, etc., bus system 230a, and I/O manager 226a. In this way, the cache 228a of the redundant controller 206a will not include stale data. Further, as shown in steps 1008, 1010, and 1012, if the cache is full when a cache line is requested, a cache line is selected based on the replacement algorithm, the selected cache line 314 is flushed, and the redundant I/O manager is instructed to clear the corresponding cache line(s) in its own cache (e.g., by resetting the dirty map of the cache line header(s) of the corresponding cache line(s) of the cache).

Figure 5:
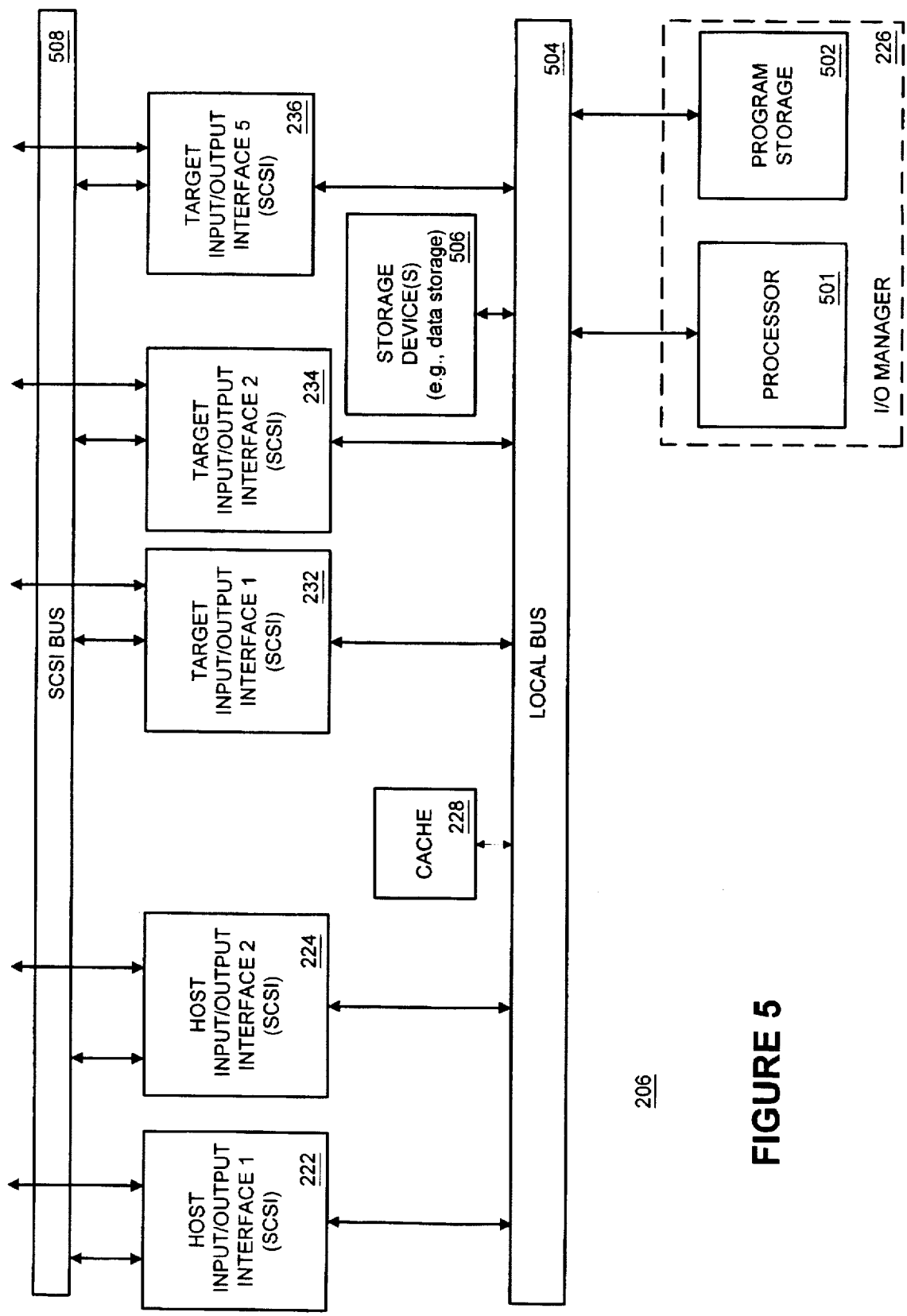
FIG. 5 illustrates a block diagram of one of the redundant storage controllers which may be used in the system of the present invention.

FIG. 5 is a block diagram which illustrates a preferred controller 206 for use in the system 200 shown in FIG. 2. The controller 206 of FIG. 5 includes a local bus 504 shared by processor 501, program storage 502, storage device(s) (e.g., data storage) 506, the cache 228, the host input/output interface units 222, 224, and the target input/output interface units 232, 234, 236, etc. The processor 501, the program storage 502 and the data storage 506 may collectively define the I/O manager 226. A SCSI bus 508 is shared by the host input/output interface units 222, 224, the target input/output interface units 232, 234, 236, etc., the cache 228 and the storage devices 506.

FIGS. 12a through 12e illustrate the states of various components of a system 1200, having an input/output management process of the present invention, during a write I/O request to a volume with write-back cache enabled. In an initial state, shown in FIG. 12a, a host 1202 issues an I/O request 1214 to write a 860 byte file to volume 2 1212 of the disk (or disk array) 1210. Assuming fixed sized blocks of 512 bytes, two (2) blocks would be needed to store the 860 byte file. In this example, the first cache 1206 is that of the storage controller responding to the I/O request and the second cache 1208 is a redundant cache. The first and second caches 1206 and 1208, respectively, may be located anywhere in the system, as long as they can communicate with the host 1202 and the disk 1210. The first and second caches 1206 and 1208 are assumed to be empty initially. A first I/O management process 1204 associated with the first cache 1206 may be carried out by a microprocessor executing stored instructions. The same is true for a second I/O Management process 1205 associated with the second cache 1208.

Figure 12A:
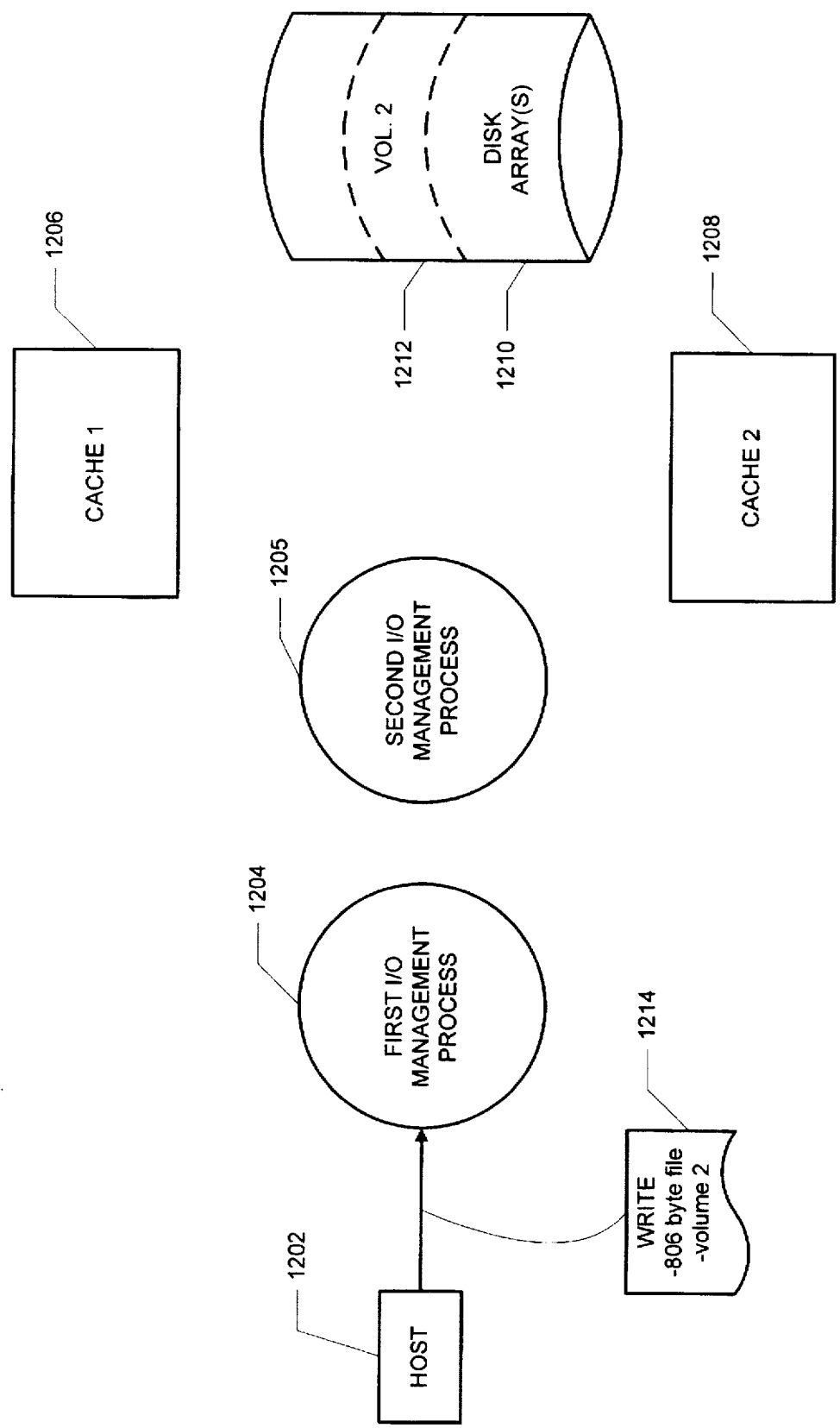
Figure 12B:
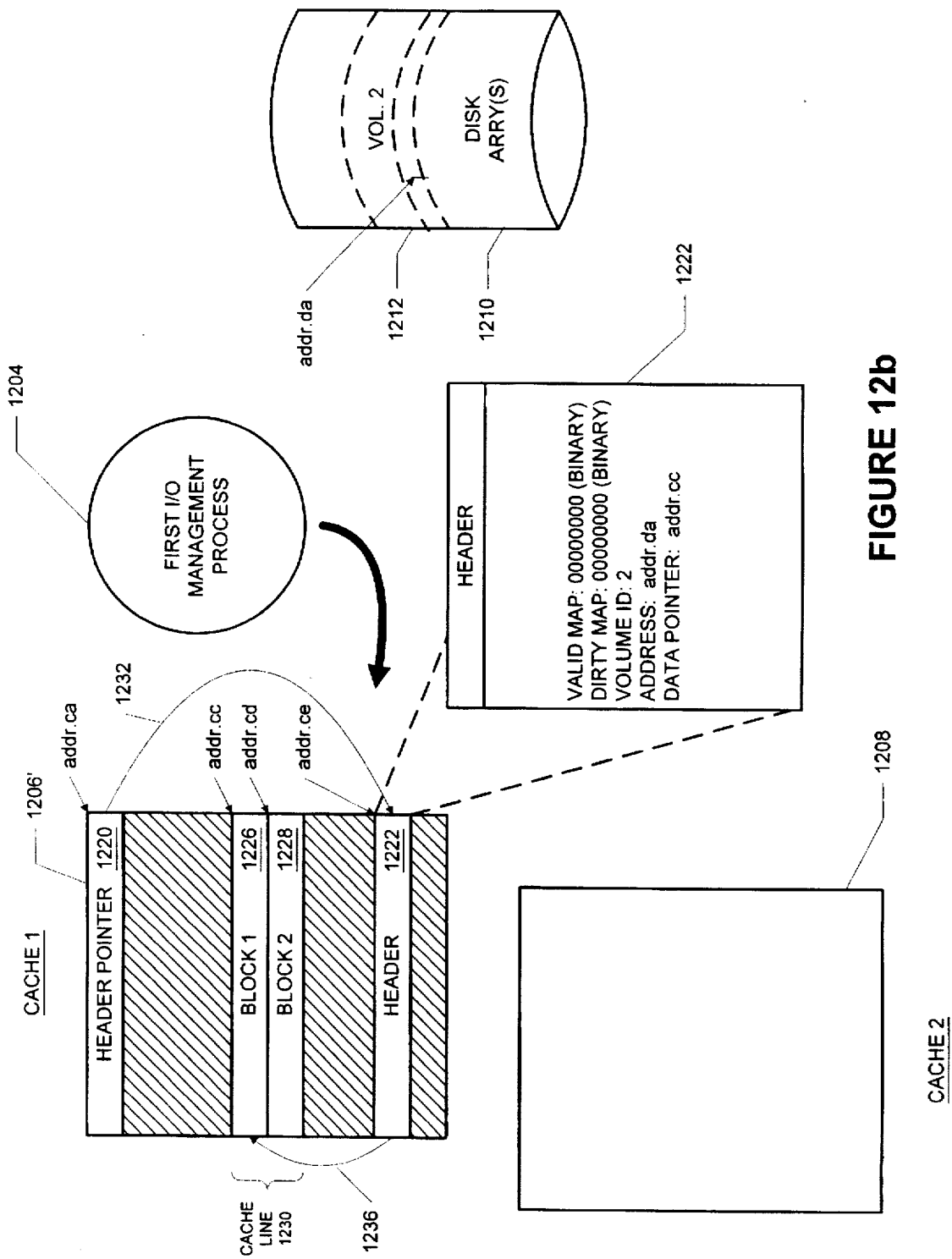

Recall that in step 804 of FIGS. 8a and 8b, an empty cache line in the first cache 1206 is found in response to a request to write data not found in the cache, a cache line is requested (step 806), valid and dirty maps are cleared and the volume ID and address fields are updated (step 810). This step is performed by the first I/O management process 1204. The state of the system 1200 after this step is performed is shown in FIG. 12b. As shown in FIG. 12b, a cache line 1230, which includes storage location(s) 1226 and 1228, is found. A header 1222 points to the address addr__cc of the first block of the cache line 1230 and to the address addr__da the space on the volume where the data belongs. The bits of the valid and dirty maps are zero.

Figure 12C:
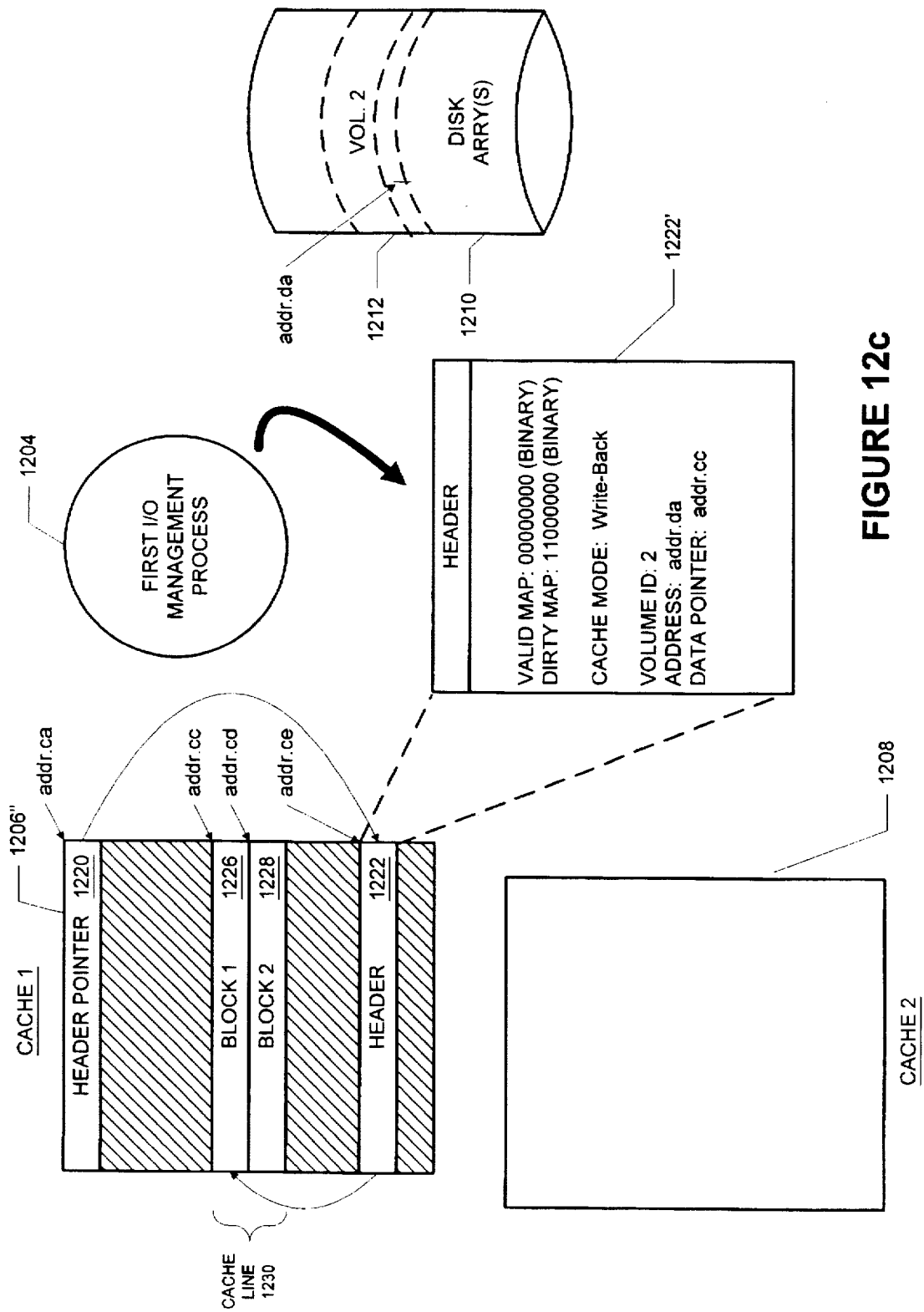

Now recall, from steps 812, 816, and 818 of FIG. 8a, that in an I/O request to a volume with write-back cache enabled, the dirty map of the cache line header is updated (step 820). The valid map may be updated during the release cache buffer phase (step 902). The cache mode of the cache line header is set to write back. As shown in FIG. 12c, the header 1222' of the cache line 1230 has a dirty map set to "11000000" binary and a cache mode set to "write-back".

Although blocks 1 and 2 may be anywhere within the cache line 1230, in this example, block 1 is the first block of the cache line 1230. In the header 1222, two (2) bits of the dirty map, corresponding to the two (2) blocks of data stored in the cache line, are set to "1". Thus, if the cache line is defined to hold 32 blocks, two (2) of the 32 bits of the dirty map are set to "1" while all other bits are set to "0". For clarity, the example illustrated in FIG. 12 assumes eight (8) blocks per cache line. The dirty map bits are set to "0" as shown until the blocks are written to the cache (See FIG. 12d.).

Now recall, from steps 904, 906, and 910 of FIG. 9, that in an I/O request write request to a volume with write-back cache enabled, coherency information (e.g., the volume, start address, length, operation and data) is transferred to redundant I/O manager(s) and its cache(s). As shown in FIG. 12d, the active I/O management process 1204 transfers the information from the first cache 1206" to the second I/O management process 1205 which handles updating the second cache 1208".

Figure 12E:
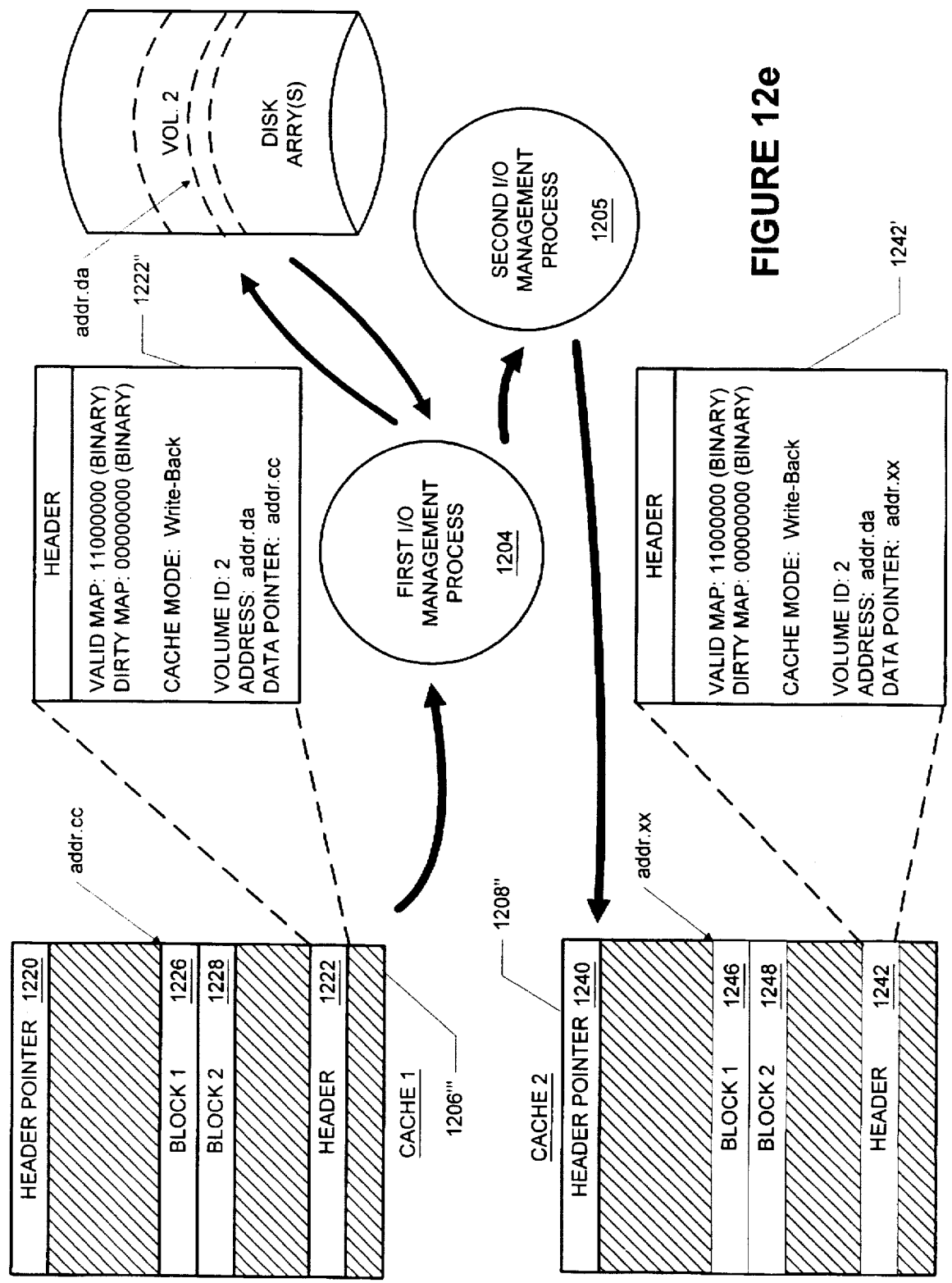

Finally, recall, from FIG. 10, that (a) if a cache line is flushed, the dirty map of the corresponding cache line header in the redundant cache is cleared or reset (steps 1004, 1006, 1010 and 1012). FIG. 12e illustrates the state of the various devices after such flush operations. As shown in FIG. 12e, once the two (2) blocks 1226 and 1226 of dirty data are written to volume 2 of the disk 1210, the dirty map of the header 1222"' of the cache 1206"' is set to "00000000" binary. Finally, the dirty map of the corresponding cache line header 1242 of the second cache 1208' is set to "00000000" binary.

Thus, the I/O management process 1204 of the present invention preserves dirty data (i.e., data not committed to persistent memory) in a redundant cache. However, it does not preserve non-dirty data (e.g., data cached during a write-through operation) in the redundant cache. Thus, data most susceptible to loss is preserved in a redundant cache, while other data is not preserved, thereby reducing the overhead associated with redundant storage operations.

What is claimed is:

1. In a system having a first cache and a second cache arranged between a client and a persistent memory device, a method for managing input/output requests which prevents data loss, the method comprising steps of:
   a) requesting a cache line in the first cache;
   b) if the input/output request is a write request to a volume with write-back cache enabled, flagging one or more blocks of dirty data in the first cache;
   c) performing a write operation;
   d) transmitting the one or more blocks of dirty data from the first cache to the second cache based on the flagging; and
   e) releasing the cache line.

2. The method of claim 1 wherein the step of flagging one or more blocks of dirty data in the first cache is achieved by updating a dirty map in the first cache to indicate the one or more blocks of dirty data in the first cache.

3. The method of claim 2 further comprising steps of:
   determining whether the requested cache line results in a cache miss; and
   if the requested cache line results in a cache miss,
      i) finding an empty cache line, and
      ii) clearing the dirty map and a valid map of the empty cache line.

4. The method of claim 1 further comprising a step of:
   setting, in response to an I/O request to a volume with write-back cache enabled, a cache mode to write-back in a header of the cache line.

5. The method of claim 1 further comprising steps of:
   configuring each of the first and second caches to have a cache directory and cache data, the cache directory including a table of headers, each of the headers corresponding to a cache line.

6. A system for providing storage for a client, the system comprising:
   a) a mass storage device;
   b) a first controller, including a cache, for controlling the mass storage device in response to requests from the client; and
   c) a second controller, including a cache, for controlling the mass storage device in response to requests from the client,
      wherein one of the first and second controllers responding to an I/O request, sends dirty data to the cache of another of the first and second controllers.

7. The system of claim 6 wherein, upon a flush of the cache of the one of the first and second controllers, the dirty map of the cache of the other of the first and second controllers is cleared.

8. The system of claim 6 wherein, upon a flush of a cache line of the cache of the one of the first and second controllers, the corresponding dirty map of the cache line header of the cache of the other of the first and second controllers is cleared.

9. The system of claim 6 wherein at least one of the first and second controllers includes:
   i) a client input/output interface unit for facilitating communication with the client;
   ii) a target input/output interface unit for facilitating communication with the mass storage device;
   iii) a cache;
   iv) an I/O management unit for controlling the cache and the I/O request; and
   v) a bus system for permitting the communication of data between the client input/output interface unit, the target input/output interface unit, the cache and the I/O management unit.

10. The system of claim 9 wherein the at least one of the client input/output interface unit and the target input/output interface unit supports the SCSI protocol.

11. The system of claim 9 wherein the cache has a data section which includes cache lines, each cache line storing one or more blocks of data, and
   wherein the cache directory section includes a table of headers, each of the headers corresponding to a cache line.

12. The system of claim 11 wherein each of the headers includes a dirty map which identifies blocks of dirty data in the cache line corresponding to the header.

13. The system of claim 6 wherein at least one of the first and second controllers includes:
   i) at least one client input/output interface unit;
   ii) at least one target input/output interface unit;
   iii) a processor;
   iv) a program storage;
   v) a data storage;
   vi) a local bus shared by the processor and the program storage, the data storage, the cache, at least one of the client I/O units, and at least one of the target I/O units;
   vii) an input/output bus shared by the at least one client input/output interface unit and the at least one target input/output interface unit; and
   viii) a SCSI bus shared by the at least one client input/output interface unit, the at least one target input/output interface unit, the data storage, and the cache.

14. The system of claim 13 wherein the cache has a data section which includes cache lines, each cache line storing one or more blocks of data, and
   wherein the cache directory section includes a table of headers, each of the headers corresponding to a cache line.

15. The system of claim 14 wherein each of the headers includes a dirty map which identifies blocks of dirty data in the cache line corresponding to the header.

16. A method for writing data from a client to a storage device, the method comprising steps of:
   a) providing a first cache between the client and the storage device;
   b) providing a second cache between the client and the storage device;
   c) accepting a write request from the client; and
   d) if the write request is a write-back request, storing the data in the first cache, and transferring the data from the first cache to the second cache.

17. The method of claim 16 further comprising steps of:
   e) flushing the data from the first cache to store the data on the storage device; and
   f) clearing a dirty map of a cache header corresponding to the blocks of the data from the second cache.

18. The method of claim 17 wherein if the write request is not a write-back request, a write-through request is performed in which blocks are stored in the first cache, stored in the storage device, but not stored in the second cache.

* * * * *